United States Patent
Subramanian et al.

(10) Patent No.: US 10,769,540 B2
(45) Date of Patent: Sep. 8, 2020

(54) RARE EVENT PREDICTION

(71) Applicant: Hewlett Packard Enterprise Development LP, Houston, TX (US)

(72) Inventors: Ajeet Subramanian, Bangalore (IN); Debashree Ghosh, Bangalore (IN); Swati Gupta, Bangalore (IN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 713 days.

(21) Appl. No.: 15/499,006

(22) Filed: Apr. 27, 2017

(65) Prior Publication Data

US 2018/0314954 A1 Nov. 1, 2018

(51) Int. Cl.
G06N 5/04 (2006.01)
G06N 20/00 (2019.01)
G06Q 10/04 (2012.01)
G06Q 30/00 (2012.01)
G06F 16/31 (2019.01)
G06F 40/279 (2020.01)

(52) U.S. Cl.
CPC ............ *G06N 5/04* (2013.01); *G06F 16/313* (2019.01); *G06F 40/279* (2020.01); *G06N 20/00* (2019.01); *G06Q 10/04* (2013.01); *G06Q 30/016* (2013.01)

(58) Field of Classification Search
None
See application file for complete search history.

(56) References Cited

U.S. PATENT DOCUMENTS

| | | | | |
|---|---|---|---|---|
| 8,244,656 B2* | 8/2012 | Petit | ....................... | G16H 50/20 |
| | | | | 706/45 |
| 8,751,421 B2* | 6/2014 | Anderson | .......... | G05B 23/0229 |
| | | | | 706/12 |
| 9,172,809 B1 | 10/2015 | Mockus et al. | | |
| 9,280,612 B2* | 3/2016 | Hao | ....................... | G06F 16/285 |
| 9,600,359 B2* | 3/2017 | Udipi | ................... | G06F 11/1012 |
| 9,779,524 B2* | 10/2017 | Hao | ....................... | G06T 11/206 |
| 10,521,358 B2* | 12/2019 | Nambiar | .............. | H04L 63/1425 |
| 2010/0076799 A1* | 3/2010 | Magent | ............... | G06Q 30/0202 |
| | | | | 705/7.31 |
| 2012/0005132 A1 | 1/2012 | Horvitz et al. | | |
| 2012/0020471 A1 | 1/2012 | Erhart et al. | | |
| 2014/0081636 A1 | 3/2014 | Erhart et al. | | |

(Continued)

OTHER PUBLICATIONS

Allison, Paul David, "Logistic Regression using SAS : Theory and Application", Wiley Interscience, 2001, 298 pages.

(Continued)

*Primary Examiner* — Paulinho E Smith
(74) *Attorney, Agent, or Firm* — Hewlett Packard Enterprise Patent Department (57) ABSTRACT

An example method for building a model to predict rare events is disclosed. The example disclosed herein comprises receiving a plurality of historical input logs wherein each log includes at least one key variable and unstructured data. The example further comprises applying text mining techniques to the unstructured data to obtain at least one predictor based on the unstructured data. The example further comprises creating a rare events prediction model based on the at least one key variable and the at least one predictor.

18 Claims, 6 Drawing Sheets

(56) References Cited

U.S. PATENT DOCUMENTS

| | | | |
|---|---|---|---|
| 2014/0149144 A1* | 5/2014 | Li | G06Q 10/10 |
| | | | 705/4 |
| 2014/0237487 A1 | 8/2014 | Prasanna et al. | |
| 2017/0185904 A1* | 6/2017 | Padmanabhan | G06F 16/00 |
| 2018/0189669 A1* | 7/2018 | Jeon | G06Q 10/047 |
| 2018/0217980 A1* | 8/2018 | Baron-Palucka | G06F 40/30 |
| 2018/0314954 A1* | 11/2018 | Subramanian | G06N 20/00 |
| 2019/0042933 A1* | 2/2019 | Powell | G06F 40/30 |

OTHER PUBLICATIONS

King et al., "Explaining Rare Events in International Relations", International Organization, vol. 55, Issue 3, 2001, pp. 693-715.
King et al., "Logistic Regression in Rare Events Data", Political Analysis, vol. 9, Issue 2, pp. 137-163.
Bruckhaus, T. et al., "Software Escalation Prediction With Data Mining", (Research Paper), Sep. 3, 2004, 3 pages.

* cited by examiner

RARE EVENT PREDICTION

BACKGROUND

Enterprises may comprise departments and teams, such as customer service centers, in charge of resolving customer issues and case logs on a daily basis. Customers' case logs may be logged into enterprises input log data pools. Some of the previous cases may be resolved by district managers or area managers. However, other cases may require to be escalated to higher tier managing positions in order to be resolved.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

The following discussion is directed to various examples of the disclosure. The examples disclosed herein should not be interpreted, or otherwise used, as limiting the scope of the disclosure, including the claims. In addition, the following description has broad application, and the discussion of any example is meant only to be descriptive of that example, and not intended to intimate that the scope of the disclosure, including the claims, is limited to that example. In the foregoing description, numerous details are set forth to provide an understanding of the examples disclosed herein. However, it will be understood by those skilled in the art that the examples may be practiced without these details. While a limited number of examples have been disclosed, those skilled in the art will appreciate numerous modifications and variations therefrom. It is intended that the appended claims cover such modifications and variations as fall within the scope of the examples. Throughout the present disclosure, the terms "a" and "an" are intended to denote at least one of a particular element. In addition, as used herein, the term "includes" means includes but not limited to, the term "including" means including but not limited to. The term "based on" means based at least in part on.

Enterprises may comprise departments and teams, such as customer service centers, in charge of resolving customer issues on a daily basis (e.g. Global Service Delivery department). The customer issues may be recorded in case logs. Customers' case logs may be logged into input log data pools (e.g. datacenters within the enterprise, public cloud, private cloud, etc.). Some of the cases may be resolved by district managers or area managers. However, other cases may require to be escalated to higher tier managing positions due to various reasons, such as complexity, engineer ownership, technical issue, process related issue, product related issue, etc. Escalating a case may be considered a rare event (e.g. less than 2% of case logs). An escalated case log takes a longer time to be resolved since the resolution process comprises an additional escalation step that requires extra time. In such cases, the resolution gets delayed and this may lead to customer resentment and significant cost implications (e.g. paying penalties to customers when service level agreements are breached). Managing the previous situation may be considered as a challenge.

Even though escalations may be considered as rare events, preempting such escalations is highly desirable because of the cost and time implications. Therefore, a predictive model that provides an early identification of cases that could potentially escalate may be helpful in dealing with the above mentioned challenge. However, rare events may be difficult to predict as the standard application of regression techniques may sharply underestimate the probability of rare events. In the present disclosure, a rare event may be understood as an event happening less than 2% of the time. For example, in a sample of 1000 case logs, a rare event may be considered that event that occurred less than 20 times within that sample; otherwise it may not be considered as a rare event. This poses a challenging issue for building a prediction model, since even large samples (e.g. 1000 case log sample) may not contain a significant sample of rare events (e.g. 20 rare events), and therefore the model built therefrom may not be accurate enough.

In some examples, departments in enterprises may rely on the personal judgement of their employees to identify cases that are likely to escalate based on intuition and past experience. This framework is unscientific and lacks the ability to predict the majority of escalations. On top of that, it does not leverage the textual content of case logs which may provide valuable insights into customer grievances.

One example of the present disclosure provides a method and system for creating a rare events prediction model. The method may receive a plurality of historical input logs, wherein each log includes at least one key variable and unstructured data. The method may further apply text mining techniques to the unstructured data to obtain at least one predictor based on the unstructured data. The method may, based on the at least one key variable and the at least one predictor, create a rare events prediction model. As mentioned above, a rare event is an event which occurs less than 2% of the time. In one example, the rare event may be an escalation in a customer service center, e.g. an escalation to higher tier management of a customer case log which needs to be resolved.

Figure 1:
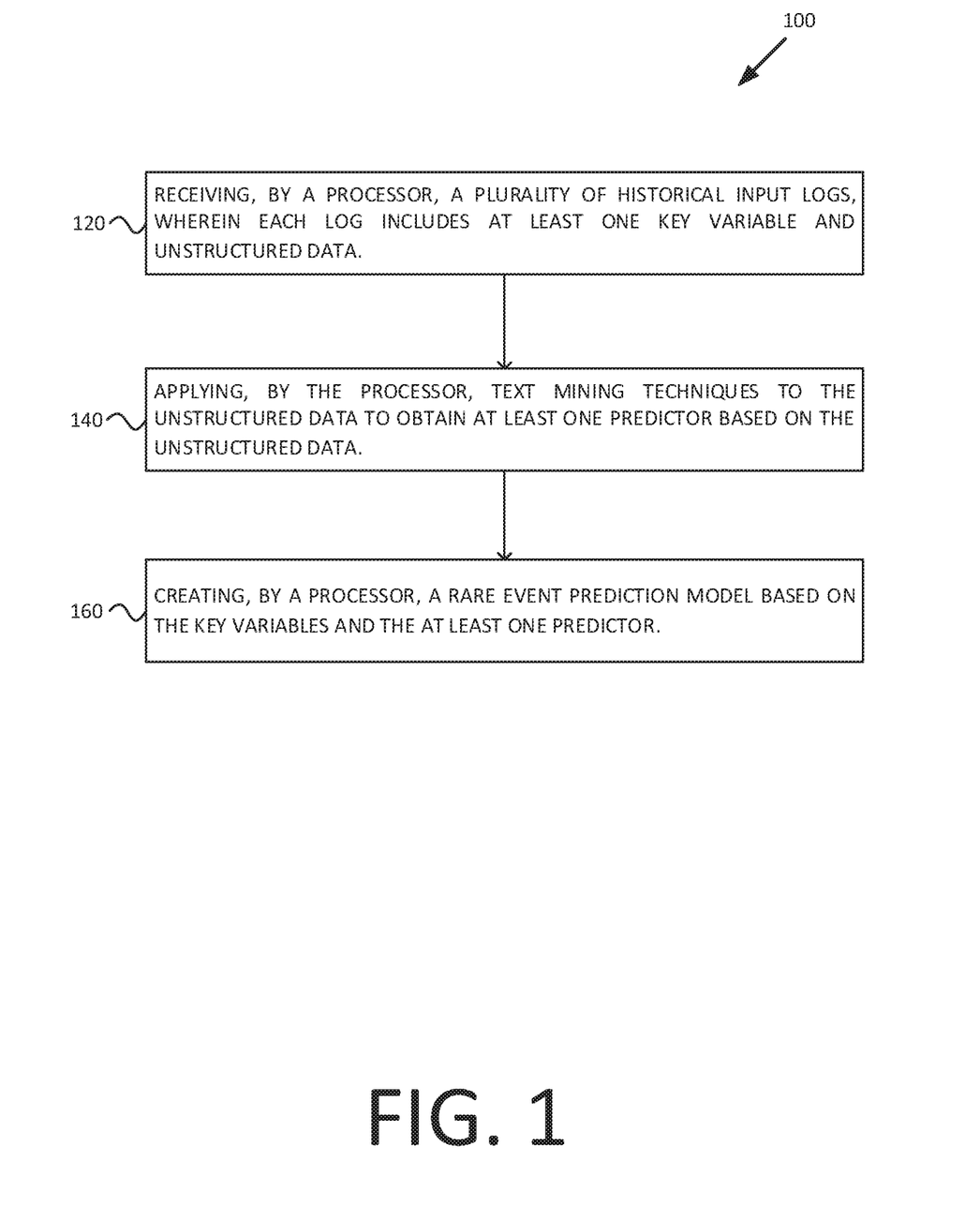
FIG. 1 is a flow chart of an example method for building a model to predict rare events.

Now referring to the drawings, FIG. 1 is a flow chart of an example method 100 for building a model to predict rare events. The method 100 of FIG. 1 may be performed by one or more processing units such as a Central Processing Unit (CPU), a System on a Chip (SoC), a single processor, and the like. For clarity purposes, the at least one processing units may be referred to as "a processor" or "the processor" hereinafter. The method 100 may have access to a data pool of historical input logs. A historical input log is a log which has been input previously. For instance case logs of historical customer cases.

The method 100 comprises a plurality of blocks which may be performed. The block 120 of receiving, by a processor, a plurality of input logs, wherein each log includes at least one key variable and unstructured data. In the present disclosure, a key variable may be understood as an item of structured data, for instance the possible values of a key variable may have a predefined format and/or content selected from a predefined list of possible entries. Some examples of key variables may be the weekday of the log (Sunday to Saturday), input hour of the log (12 am-11 am), country of the customer (e.g. USA, Spain, India), operational elements (e.g. exact time of the issue, shift change time), and the like. For example, the key variables may be in fields of a case log that are automatically populated by the customer service system or selected by a customer operative from a limited list of options. In contrast, unstructured data may be understood as a field including free form content that is not predefined in format or content. That is, the values or content of the unstructured data may not be confined to a limited list. Some examples of unstructured data may be product features (e.g. chassis of the server, blade, enclosure), customer industry (e.g. bureau, healthcare, bank, marine), explanation of the problem (e.g. system fails to boot, overheating of the memory fabric, server down, memory full), customer comments, and the like. For example, the unstructured data may have been entered into the case log by a customer service operative.

The method 100 also comprises the block 140 of applying, by a processor, text mining techniques to the unstructured data to obtain at least one predictor based on the unstructured data. Text mining techniques may be understood as those techniques applied to a text description (e.g. unstructured data) to obtain keywords of interest that provide value to the predicting method (e.g. see example of applying text mining techniques disclosed in FIG. 3). These keywords obtained by applying the text mining techniques to the unstructured data may have predictive value, and they are referred hereinafter as predictors. The result of applying text mining techniques to the unstructured data from an input log may be one or more predictors.

The method 100 further comprises the block 160 of creating, by the processor, a rare events prediction model based on the at least one key variable and the at least one predictor. The event prediction model may be a regression model that predicts whether an input log will be escalated or not. One example of creating a rare events prediction model based on the at least one key variable and the at least one predictor is further disclosed in FIG. 4 of the present disclosure.

Figure 2:
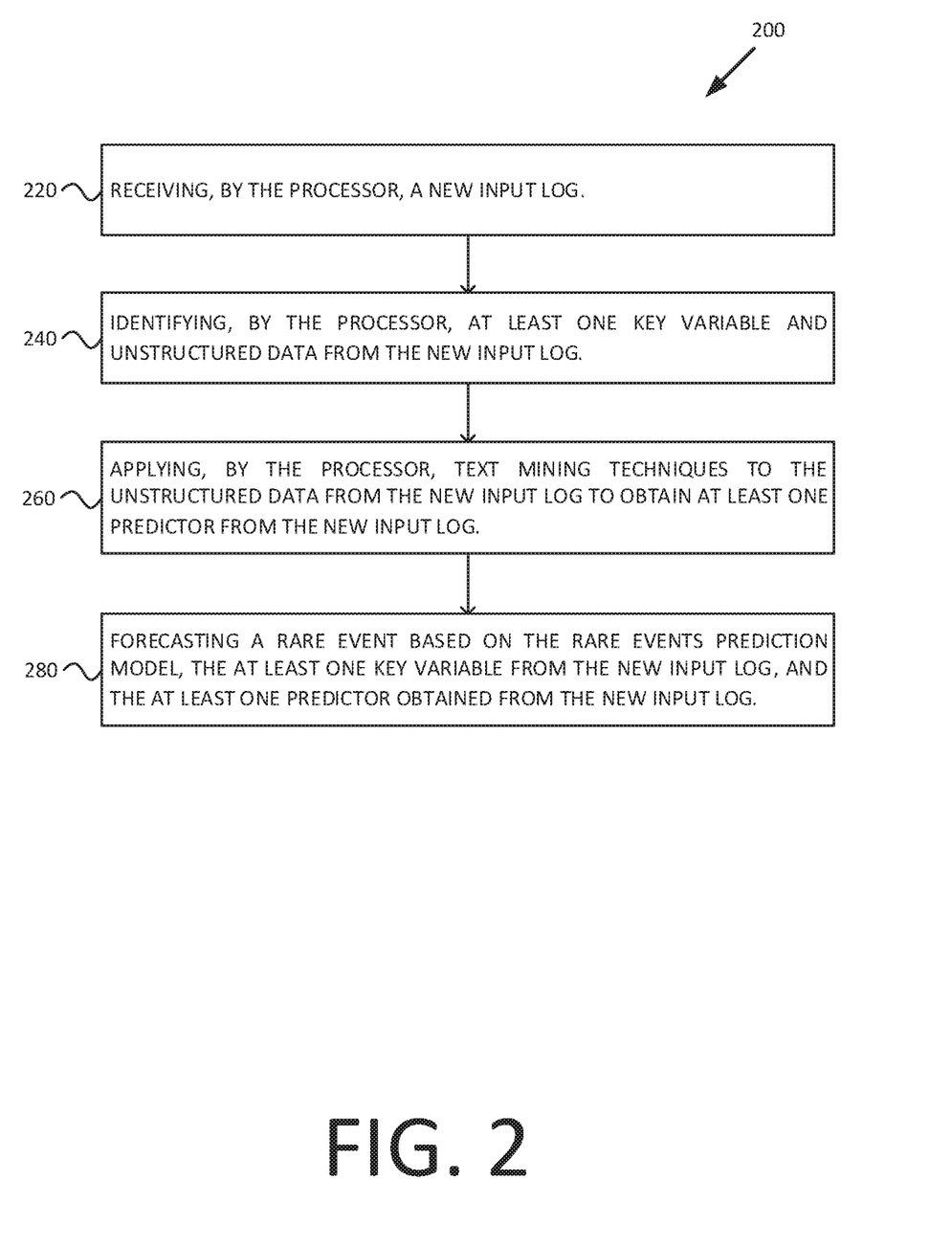
FIG. 2 is a flow chart of an example method for forecasting a rare event based on a rare events prediction model.

FIG. 2 is a flow chart of an example method 200 for forecasting a rare event based on a rare events prediction model. The method 200 of FIG. 2 may be performed by one or more processing units such as a CPU, a SoC, a single processor, and the like. However, for clarity purposes and with no aim of restricting the subject matter of the disclosure, the present disclosure may use the terms "a processor" or "the processor" hereinafter. The method 200 may have access to a rare events prediction model. The rare events prediction model may be similar or the same as the rare events prediction model from block 160 of FIG. 1.

The method 200 comprises a plurality of blocks which may be performed. The block 220 of receiving, by the processor, a new input log.

The method 200 may further comprise the block 240 of identifying, by the processor, at least one key variable and unstructured data from the new input log.

The method 200 may also comprise the block 260 of applying, by the processor, text mining techniques to the unstructured data from the new input log to obtain at least one predictor from the new input log. The block 260 may be similar or the same as the block 140 from FIG. 1.

The method 200 may further comprise the block 280 of forecasting a rare event based on the rare events prediction model, the at least one key variable from the new input log, and the at least one predictor obtained from the new input log. As an example, the rare events prediction model may be a regression model with a rare event score as the dependent variable, and the at least one key variable and at least one predictor as independent variables. In order to receive the rare event score, the at least one key variable identified from the new input log in block 240, and the at least one predictor identified by applying text mining techniques to the unstructured data of the new input log in block 260, may be introduced as independent variables of the rare events prediction model. The rare events prediction model may output a rare event score, which may be compared to a preset rare event score threshold to predict whether the new input log is likely to result in a rare event or not.

Figure 3:
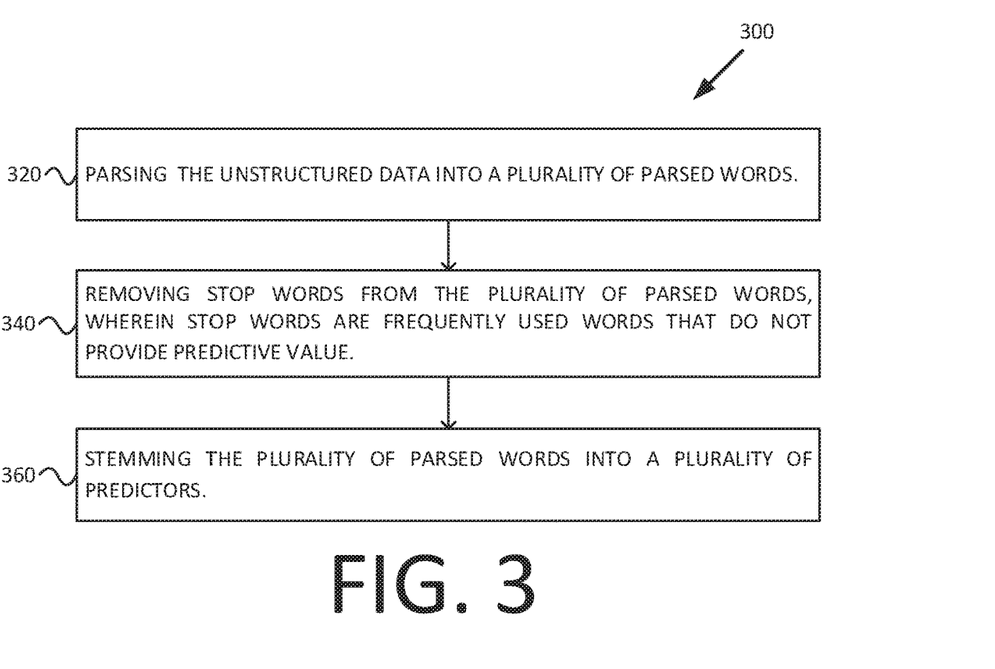
FIG. 3 is a flow chart of an example method for applying text mining techniques to unstructured data to obtain at least one predictor.

FIG. 3 is a flow chart of an example method for applying text mining techniques to unstructured data to obtain at least one predictor. The method 300 of FIG. 3 may be performed by one or more processing units such as a CPU, a SoC, a single processor, and the like. However, for clarity purposes and with no aim of restricting the subject matter of the disclosure, the present disclosure may use the terms "a processor" or "the processor" hereinafter. The method 300 may have access to unstructured data from an input log. Method 300 may be applied, for example, as the block 140 from FIG. 1 or as the block 260 from FIG. 2.

The method 300 comprises a plurality of blocks which may be performed. The block 320 of parsing the unstructured data into a plurality of parsed words. The unstructured data may be in a form of a text description (e.g. explanation of the problem or the comments that a customer sent to the customer service center), therefore parsing techniques may be applied to examine the exact meaning of the words from the customer. Parsing techniques are those techniques that perform a grammatical analysis to the unstructured data. As an example, after applying parsing techniques to unstructured data (e.g. server model ABC is down due to overheating), method 300 may parse the unstructured data into a plurality of parsed words, wherein parsed words may be understood as an array of independent words (e.g. server, model, ABC, is, down, due, to, overheating,).

The method 300 may also comprise the block 340 of removing stop words from the plurality of parsed words, wherein stop words are frequently used words that do not provide predictive value. In the present disclosure, stop words may be understood as those parsed words from block 320 may not provide predictive value (e.g. prepositions, conjunctions, and the like). As a first example, block 340 may have access to list or database of stop words, such as a list or database of English prepositions and English conjunctions. In other examples the list or database may include stop words from another language, such as Spanish, French, etc. As a second example, block 340 may use string techniques to identify input log specific stop words (e.g. the parsed word "heat" may have high predictive value if it appears in a string of words along with the word "server", but low predictive value if it appears in a string of words along with the word "solar panel"). In the present disclosure string techniques may be understood, for example, as those techniques that comprise (1) term extraction, wherein the method may derive the meaning or content from free form of text (e.g. the plurality of parsed words), and (2) feature creation, wherein the method may apply classification techniques which may reduce many potential features into smaller number of final variables (e.g. removing the stop words). As a third example, block 340 may use both a list and database of stop words and string techniques to obtain a more refined stop word pruning.

The method 300 may further comprise the block 360 of stemming the plurality of parsed words into a plurality of predictors. Block 360 may stem the plurality of parsed words, after removing the stop words, by grouping together parsed words that have a similar meaning and/or share the same root and creating a predictor corresponding to the group of parsed words which have a similar meaning and/or share the same root. As a first example, after the stop word pruning, the remaining parsed words may comprise ROUTER, ROUTING and ROUTE, all of the previous sharing the same word root -ROUT-. In this first example, block 360 may group all the previous parsed words into a single predictor "ROUT". As a second example, after the stop word pruning, the remaining parsed may comprise HEATING, HEAT, HEAST, OVERHEAT, OVERHEATS, OVERHEATING, all of the previous sharing the same word root -HEAT- and have a similar meaning. In this second example, block 360 may group all the previous parsed words into a single predictor "HEAT". The output of block 360 are one or more predictors, which may contain relevant predictive value. Predictors from a new input log may be used to predict whether the input log is likely to lead to a rare event. Predictors from historical input logs may be also used to create a rare event predictor model.

Figure 4:
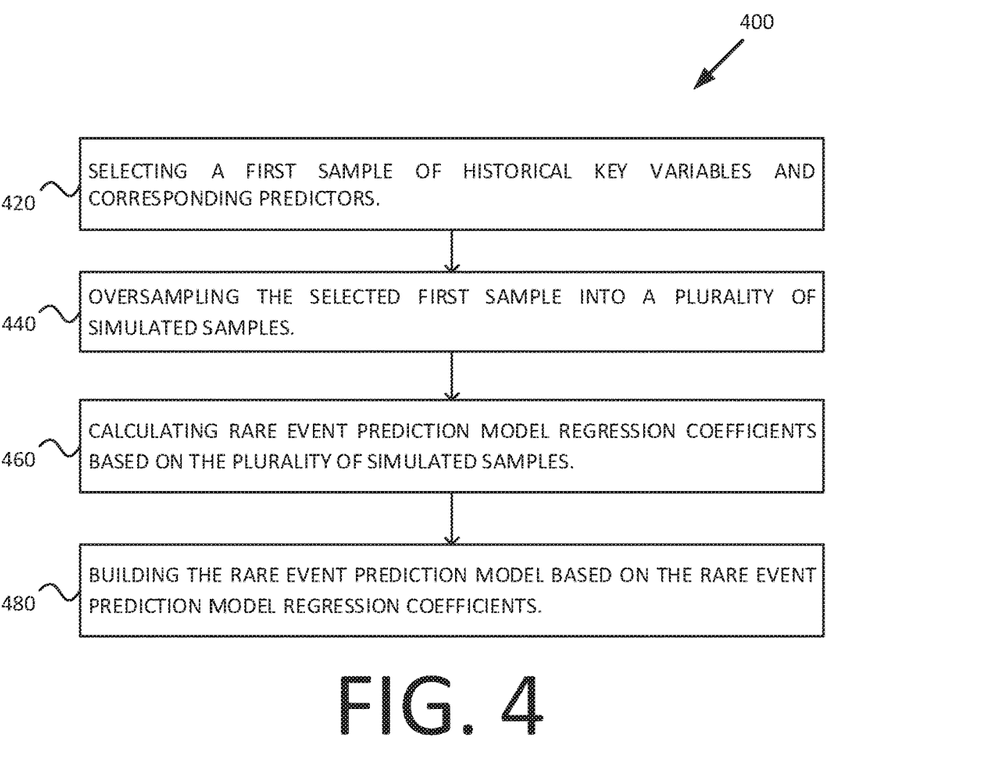
FIG. 4 is a flow chart of an example method for building a rare events prediction model based on historical data.

FIG. 4 is a flow chart of an example method for building a rare events prediction model based on historical data. The method 400 of FIG. 4 may be performed by one or more processing units such as a CPU, a SoC, a single processor, and the like. However, for clarity purposes and with no aim of restricting the subject matter of the disclosure, the present disclosure may use the terms "a processor" or "the processor" hereinafter. The method 400 may have access to key variables from an input log and to at least one predictor. Method 400 may be applied, for example, as the block 160 from FIG. 1.

The processor may have access to a large pool of historical input logs, wherein key variables and predictors of each logs have already been identified. The processor may split the large pool of historical input logs into two samples, for example, the first sample of historical key variables and corresponding predictors, and the second sample of historical key variables and corresponding predictors. The method 400 may comprise a plurality of blocks which may be performed. The block 420 of selecting a first sample of historical key variables and corresponding predictors.

Due to the fact that it is a rare events prediction model, there may not be a significant number of rare events input logs in the first sample to build an accurate rare events prediction model. Because of this, the method 400 may further comprise the block 440 of oversampling the selected first sample into a plurality of simulated samples in order to obtain more data points to input to the model and therefore enhancing the accuracy of the model. For example, in a first sample of 10000 input logs in which only 50 input logs were rare events, the method may need to oversample these rare events input logs to get further predictive value from them. One example of oversampling technique is described hereinafter, however, many other oversampling techniques may be applied. The oversampling technique described herein may select the first sample and randomly select a plurality of subsets of the first sample, each subset from the plurality of subsets of the first sample may be referred hereinafter as a simulated sample. Each simulated sample is randomly picked, and therefore the corresponding number of rare events may vary. For example, Table 1 below illustrates the example, the processor may have picked an original first sample from the historical input logs with its corresponding key variables and predictors of 10 000 input logs, wherein only 50 input logs were rare events (e.g. were escalated). The processor further may have built N subsets from the historical input logs, wherein N is a positive integer. The first simulated sample randomly picked 9 980 historical input logs wherein 49 were rare events. The second simulated sample randomly picked 9 750 historical input logs wherein 49 were rare events. The third simulated sample also randomly picked 9750 historical input logs wherein 48 were rare events. Up to the Nth simulated sample that randomly picked 8 845 historical logs wherein 41 were rare events. Following with the example, the processor may use statistical techniques to calculate the key regression coefficients from the key variables and predictors as independent variables, taking the amount of rare events as the dependent variable.

TABLE 1

An example of oversampling technique

| Simulated Sample No. | Amount of historical input logs | Amount of rare events | Key variables | Predictors |
|---|---|---|---|---|
| Original Sample (0) | 10 000 | 50 | A, B, C, D | M, P, Q, R |
| 1 | 9 980 | 49 | A, C, D, E | P, Q |
| 2 | 9 750 | 49 | A, D, E | M, Q, R |
| 3 | 9 750 | 48 | A, B, E | Q, S |
| ... | ... | ... | ... | ... |
| N | 8 845 | 41 | A, E, F | M, Q, S |

Following with the example, Table 2 illustrates the key variables and predictors and their regression coefficient for every simulated sample. The original sample (sample 0) comprises A, B, C, and D as significant key variables with their corresponding regression coefficients A0, B0, C0, and D0; sample 0 further comprises M, P, Q, and R as predictors with their corresponding regression coefficients M0, P0, Q0, and R0. Sample 1 comprises A, C, D, and E as significant key variables with their corresponding regression coefficients A1, C1, D1, and E1; sample 1 further comprises P and Q as significant predictors with their corresponding regression coefficients P1 and Q1. Sample 2 comprises A, D, and E as significant key variables with their corresponding regression coefficients A2, D2, and E2; sample 2 further comprises M, Q, and R as predictors with their corresponding regression coefficients M2, Q2, and R2. Sample 3 comprises A, B, D, and E as significant key variables with their corresponding regression coefficients A3, B3, D3, and E3; sample 3 further comprises Q and S as predictors with their corresponding regression coefficients Q3 and S3. And so on up to Sample N that comprises A, E, and F as key variables with their corresponding regression coefficients AN, EN, and FN; sample N further comprises M, Q, S as significant predictors with their corresponding regression coefficients MN, QN, and SN.

TABLE 2

An example of simulated samples key variables, predictors and regression coefficients

| Sample | No. logs | No. rare events | A | B | C | D | E | F | M | P | Q | R | S |
|---|---|---|---|---|---|---|---|---|---|---|---|---|---|
| 0 | 10000 | 50 | A0 | B0 | C0 | D0 | — | — | M0 | P0 | Q0 | R0 | — |
| 1 | 9 980 | 49 | A1 | — | C1 | D1 | E1 | — | — | P1 | Q1 | — | — |
| 2 | 9 750 | 49 | A2 | — | — | D2 | E2 | — | M2 | — | Q2 | R2 | — |
| 3 | 9 750 | 48 | A3 | B3 | — | D3 | E3 | — | — | — | Q3 | — | S3 |
| ... | ... | ... | ... | ... | ... | ... | ... | ... | ... | ... | ... | ... | ... |
| N | 8 845 | 41 | AN | — | — | — | EN | FN | MN | — | QN | — | SN |

The method 400 may further comprise the block 460 of calculating rare events prediction model regression coefficients based on the plurality of simulated samples. As a first example, the processor may do an arithmetic mean of all the coefficients of the same key variable or predictor. For example, the rare events prediction model regression A coefficient may be calculated by adding up A0+A1+A2+A3+ . . . +AN, and then divide by the total amount of samples (N+1). However, the above-mentioned simulated sample coefficients are biased towards each of the samples, since the simulated samples coefficients have been calculated based on the corresponding simulated sample, rather than the original sample. As a second example, the processor may perform a weighted average, assigning weights to the coefficients based on the number of sample logs and the number of rare events in each of the simulated samples. However, each of the coefficients may be biased as well. As a third example, the processor may unbias the simulated sample coefficients to compensate the oversampling. One example of unbiasing the simulated sample coefficients may be applying the following formula:

$$COEF_{UNBIASED} = COEF_{BIASED} - \ln\left[\frac{\tau}{1-\tau} * \frac{\gamma}{1-\gamma}\right];$$

wherein $\tau$ is the fraction of rare events in the original sample, and $\gamma$ is the fraction of rare events in the simulated sample.

Following with the third example, when the processor may have unbiased the simulated samples key variables coefficients and predictors coefficients, the processor may apply an arithmetic mean to the unbiased coefficients to obtain the rare events prediction model regression coefficients.

The method 400 may further comprise the block 480 of building the rare events prediction model based on the rare events prediction model regression coefficients.

The method 400 may further validate the rare events prediction model based on the second sample of historical key variables and corresponding predictors. The second sample of historical key variables and corresponding predictors may be different to the first sample of historical key variables and corresponding predictors. In one example, the validation may consist on forecasting which input logs from the second sample of historical key variables and corresponding predictors are rare events, compare with the actual logs from the second sample that were rare events; and then comparing the accuracy with a preset rare event score threshold. If the actual accuracy meets the preset rare event score threshold, the model is accepted and valid to be used to forecast new input logs, otherwise, the model must be redone with additional data.

As an example, the model is updated in a preset timestamp basis (e.g. every 3 months, every 5 months) to have a more accurate up-to-date model to perform forecasting of rare events that takes into account more recent input logs.

Figure 5:
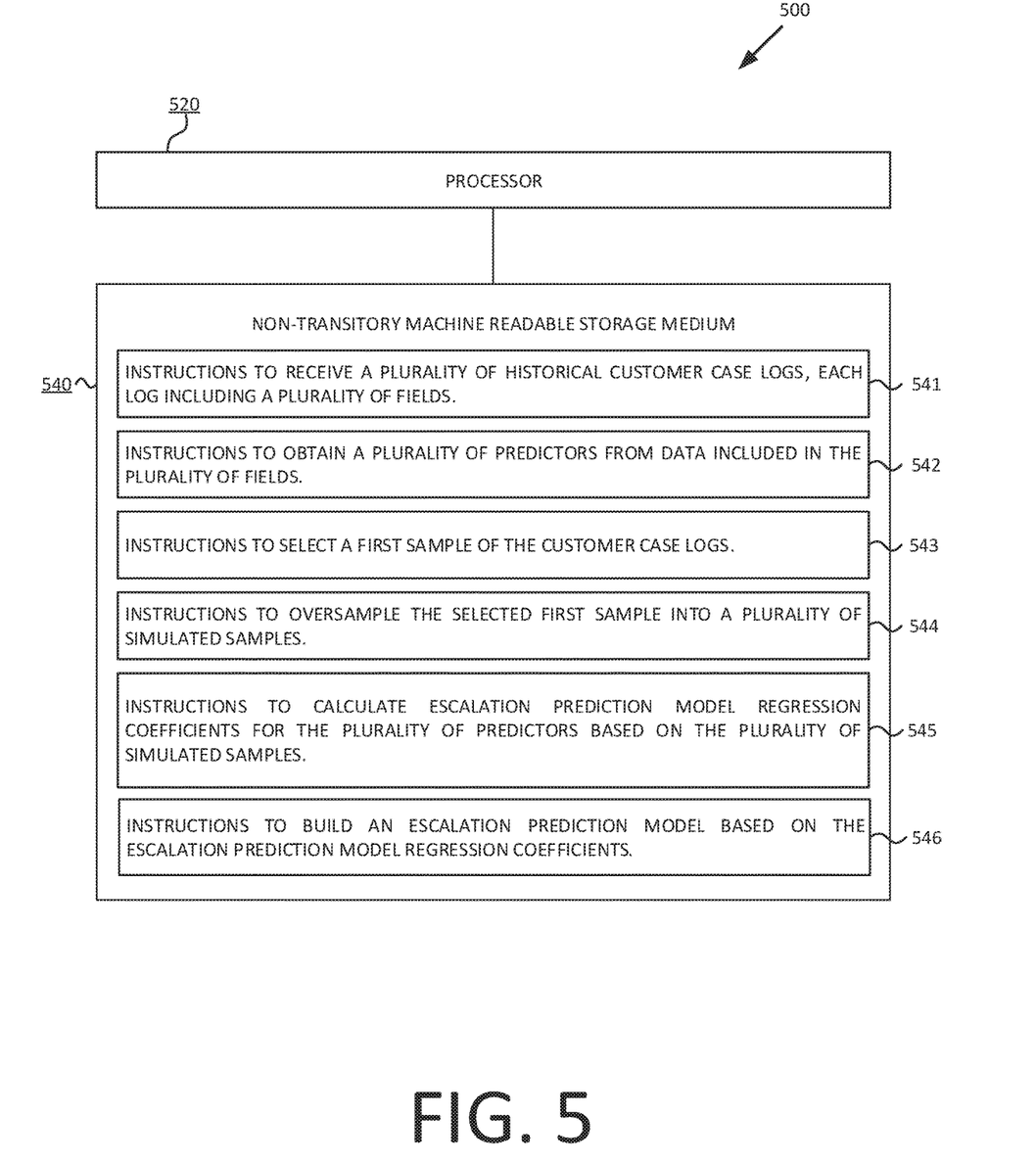
FIG. 5 is a block diagram illustrating a system example for predicting escalations in a customer service center.

FIG. 5 is a block diagram illustrating a system 500 example for predicting escalations in a customer service center. The system 500 may comprise one or more processing units such as a CPU, a SoC, a single processor, and the like. However, for clarity purposes the one or more processing units may be referred to as "a processor" or "the processor" hereinafter. The system 500 comprises a processor 520 and a non-transitory machine readable storage medium 540. The non-transitory storage medium 540 may for example be random access memory (RAM), non-volatile memory, flash memory, a hard disk etc. The non-transitory storage medium comprises instructions 541-546 that cause the processor 520 to perform the functionality described herein. The system 500 may be adapted to perform similar or the same functionality as described in FIG. 1-4.

The non-transitory storage medium 540 comprises instructions 541 to receive a plurality of historical customer case logs, each log including a plurality of fields. In the present disclosure, the historical customer case logs may be the same or similar as the historical input logs from FIG. 1 to FIG. 4.

The non-transitory storage medium 540 further comprises instructions 542 to obtain a plurality of predictors from data included in the plurality of fields. As an example, instructions 542 may comprise the instructions to perform method 300 from FIG. 3 applied to the data included in the plurality of fields.

The non-transitory storage medium 540 further comprises instructions 543 to select a first sample of the customer case logs. As an example, instructions 543 may comprise the instructions to perform block 420 from FIG. 4.

The non-transitory storage medium 540 further comprises instructions 544 to oversample the selected first sample into a plurality of simulated samples. As an example, instructions 544 may comprise the instructions to perform block 440 from FIG. 4.

The non-transitory storage medium 540 further comprises instructions 545 to calculate escalation prediction model regression coefficients for the plurality of predictors based on the plurality of simulated samples. In the present disclosure, the escalation prediction model regression coefficients may be similar or the same as the rare events prediction model regression coefficients disclosed in FIG. 4. As an example, instructions 545 may comprise the instructions to perform block 460 from FIG. 4.

The non-transitory storage medium 540 further comprises instructions 546 to build an escalation prediction model based on the escalation prediction model regression coefficients. In the present disclosure, the escalation prediction model may be similar or the same as the rare events prediction model disclosed in FIG. 1, FIG. 2, and FIG. 4. As an example, instructions 546 may comprise the instructions to perform block 480 from FIG. 4. The escalation prediction model may be used to predict escalation of a customer case log in a customer service center. In this context, an escalation may for example involve escalation of the customer case to a higher tier level of management.

Figure 6:
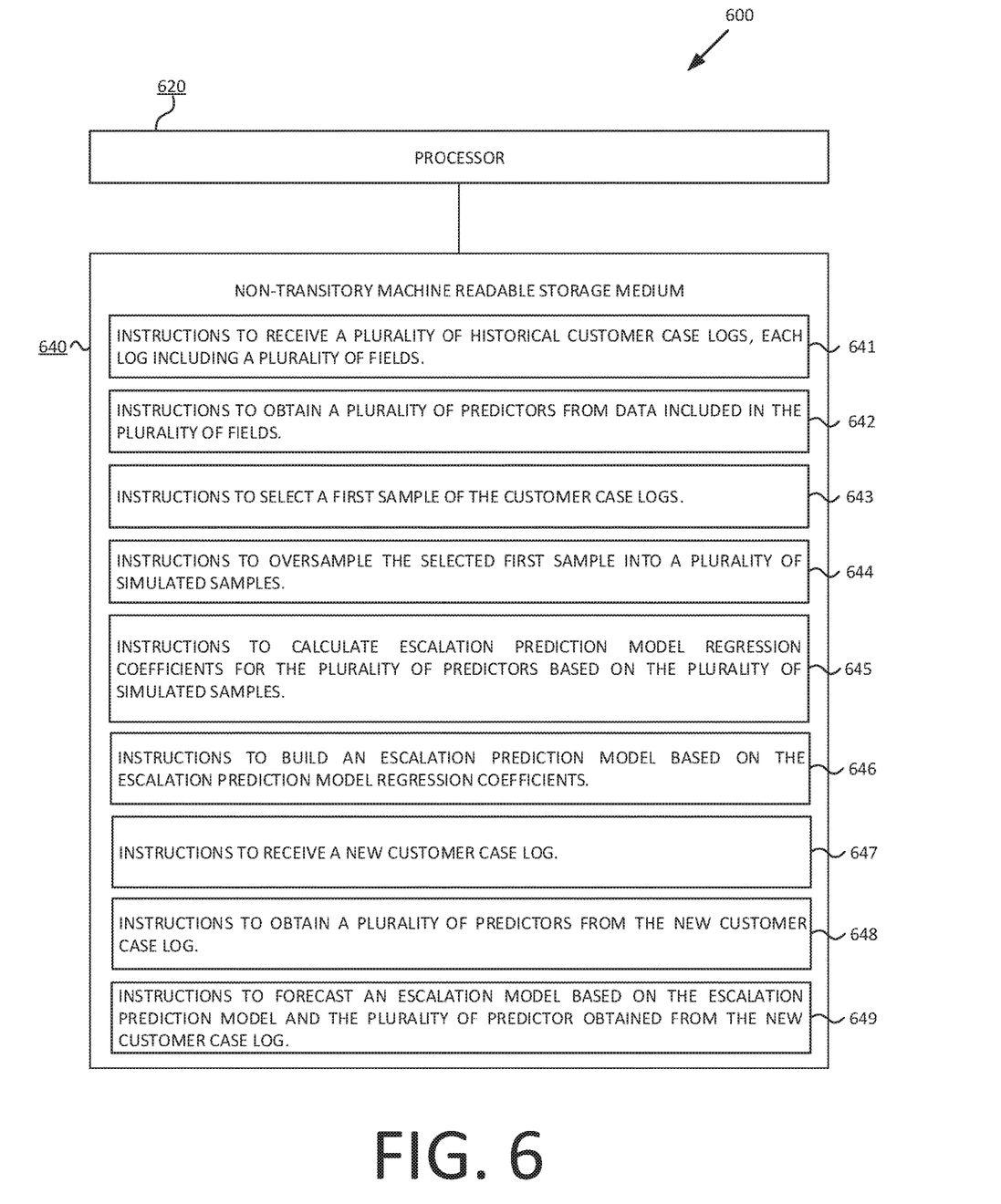
FIG. 6 is a block diagram illustrating another system example for predicting escalations in a customer service center.

FIG. 6 is a block diagram illustrating another system example for predicting escalations in a customer service center. The system 600 may comprise one or more processing units such as a CPU, a SoC, a single processor, and the like. However, for clarity purposes the one or more processing units may be referred to as "a processor" or "the processor" hereinafter. The system 600 comprises a processor 620 and a non-transitory machine readable storage medium 640. The non-transitory storage medium 640 may for example be random access memory (RAM), non-volatile memory, flash memory, a hard disk, etc. The non-transitory storage medium comprises instructions 641-649 that cause the processor 620 to perform the functionality described herein. The system 600 may be similar to the system 500 from FIG. 5. The system 600 may be adapted to perform similar or the same functionality as described in FIG. 1-4.

The non-transitory storage medium 640 comprises instructions 641 to receive a plurality of historical customer case logs, each log including a plurality of fields. In the present disclosure, the historical customer case logs may be the same or similar as the historical input logs from FIG. 1 to FIG. 3. Instructions 641 may be the same or similar as the instructions 541 from FIG. 5.

The non-transitory storage medium 640 further comprises instructions 642 to obtain a plurality of predictors from data included in the plurality of fields. As an example, instructions 642 may comprise the instructions to perform method 300 from FIG. 3 applied to the data included in the plurality of fields. Instructions 642 may be the same or similar as the instructions 542 from FIG. 5. In one example, the plurality of fields include unstructured text data and the machine readable instructions include instructions to text mine the unstructured text data to obtain the plurality of predictors. Following with the example, the text mining techniques within the machine readable instructions may comprise to parse the unstructured text data into a plurality of parsed words, to remove stop words from the plurality of stop words (e.g. using string techniques), wherein stop words are frequently used words that do not provide predictive value, and to stem the plurality of parsed words into a plurality of predictors (e.g. by grouping together parsed words that share the same root as a predictor). The text mining techniques within the machine readable instructions from the example, may be the same or similar as the instructions to perform method 300 from FIG. 3 applied to the data included in the plurality of fields.

The non-transitory storage medium 640 further comprises instructions 643 to select a first sample of the customer case logs. As an example, instructions 643 may comprise the instructions to perform block 420 from FIG. 4. Instructions 643 may be the same or similar as the instructions 543 from FIG. 5.

The non-transitory storage medium 640 further comprises instructions 644 to oversample the selected first sample into a plurality of simulated samples. As an example, instructions 644 may comprise the instructions to perform block 440 from FIG. 4. Instructions 644 may be the same or similar as the instructions 544 from FIG. 5.

The non-transitory storage medium 640 further comprises instructions 645 to calculate escalation prediction model regression coefficients for the plurality of predictors based on the plurality of simulated samples. In the present disclosure, the escalation prediction model regression coefficients may be similar or the same as the rare events prediction model regression coefficients disclosed in FIG. 4. As an example, instructions 645 may comprise the instructions to perform block 460 from FIG. 4. Instructions 645 may be the same or similar as the instructions 545 from FIG. 5. In one example, the machine readable instructions 645 may further comprise instructions to cause the processor 620 to unbias the escalation prediction model regression coefficients to compensate for the over sampling.

The non-transitory storage medium 640 further comprises instructions 646 to build an escalation prediction model based on the escalation prediction model regression coefficients. In the present disclosure, the escalation prediction model may be similar or the same as the rare events prediction model disclosed in FIG. 1, FIG. 2, and FIG. 4. As an example, instructions 646 may comprise the instructions to perform block 480 from FIG. 4. Instructions 646 may be the same or similar as the instructions 546 from FIG. 5.

The non-transitory storage medium 640 further comprises instructions 647 to receive a new customer case log. As an example, instructions 647 may comprise the instructions to perform block 220 from FIG. 2.

The non-transitory storage medium 640 further comprises instructions 648 to obtain a plurality of predictors from the new customer case log. As an example, instructions 648 may comprise the instructions to perform method 300 from FIG. 3 applied to the new customer case log.

The non-transitory storage medium 640 further comprises instructions 649 to forecast an escalation model based on the escalation prediction model and the plurality of predictors obtained from the new customer case log. As an example, instructions 649 may comprise the instructions to perform block 280 from FIG. 2.

Figure 7:
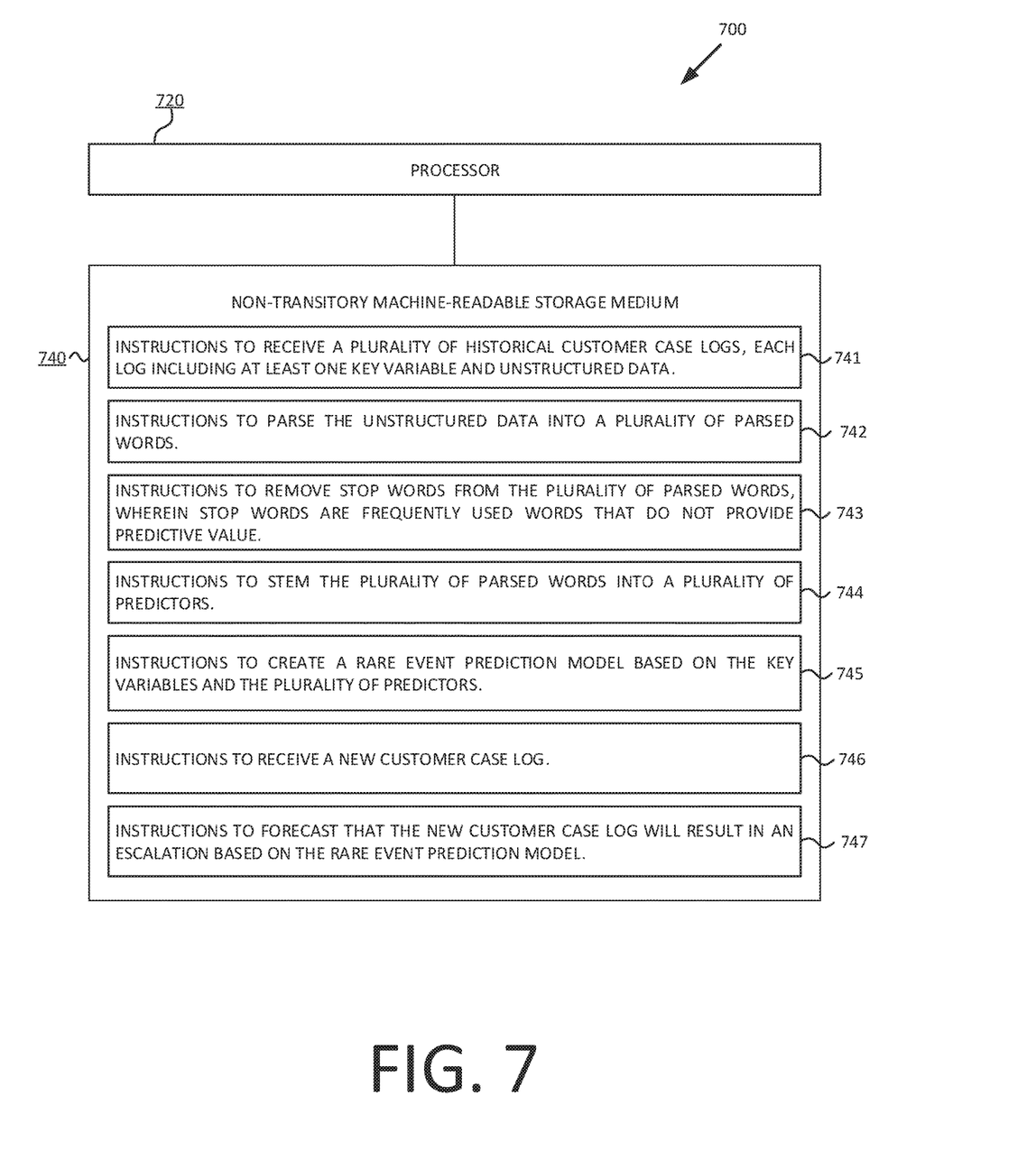
FIG. 7 is a block diagram illustrating a system example for predicting escalations.

FIG. 7 is a block diagram illustrating an example system for predicting escalations. FIG. 7 describes a system 700 that includes a physical processor 720 and a non-transitory machine-readable storage medium 740. The processor 720 may be a microcontroller, a microprocessor, a central processing unit (CPU) core, an application-specific-integrated circuit (ASIC), a field programmable gate array (FPGA), and/or the like. The machine-readable storage medium 740 may store or be encoded with instructions 741-747 that may be executed by the processor 720 to perform the functionality described herein. System 700 hardware may be the same or similar as the hardware in system 500 of FIG. 5. System 700 hardware may be the same or similar as the hardware in system 600 of FIG. 6. System 700 may use the method 100 of FIG. 1. System 700 may use the method 200 of FIG. 2. System 700 may use the method 300 of FIG. 3. System 700 may use the method 400 of FIG. 4.

In an example, the instructions 741-747, and/or other instructions can be part of an installation package that can be executed by the processor 720 to implement the functionality described herein. In such case, non-transitory machine readable storage medium 740 may be a portable medium such as a CD, DVD, or flash device or a memory maintained by a computing device from which the installation package can be downloaded and installed. In another example, the program instructions may be part of an application or applications already installed in the non-transitory machine-readable storage medium 740.

The non-transitory machine readable storage medium 740 may be an electronic, magnetic, optical, or other physical storage device that contains or stores executable data accessible to the system 700. Thus, non-transitory machine readable storage medium 740 may be, for example, a Random Access Memory (RAM), an Electrically Erasable Programmable Read-Only Memory (EEPROM), a storage device, an optical disk, and the like. The non-transitory machine readable storage medium 740 does not encompass transitory propagating signals. Non-transitory machine readable storage medium 740 may be allocated in the system 700 and/or in any other device in communication with system 700.

In the example of FIG. 7, the instructions 741, when executed by the processor 720, cause the processor 720 to receive a plurality of historical customer case logs, each log including at least one key variable and unstructured data.

The system 700 may further include instructions 742 that, when executed by the processor 720, cause the processor 720 to parse the unstructured data into a plurality of parsed words.

The system 700 may further include instructions 743 that, when executed by the processor 720, cause the processor 720 to remove stop words from the plurality of parsed words, wherein stop words are frequently used words that do not provide predictive value.

The system 700 may further include instructions 744 that, when executed by the processor 720, cause the processor 720 to stem the plurality of parsed words into a plurality of predictors.

The system 700 may further include instructions 745 that, when executed by the processor 720, cause the processor 720 to create a rare events prediction model based on the key variables and the plurality of predictors.

The system 700 may further include instructions 746 that, when executed by the processor 720, cause the processor 720 to receive a new customer log.

The system 700 may further include instructions 747 that, when executed by the processor 720, cause the processor 720 to forecast that the new customer case log will result in an escalation based on the rare events prediction model.

The system 700 may further include additional instructions that, when executed by the processor 720, cause the processor 720 to identify at least one key variable and unstructured data from the new customer case log; to apply text mining techniques to the unstructured data from the new customer case log to obtain a corresponding plurality of predictors from the new customer case log, and to forecast a rare event based on the rare events prediction model, the key variables from the new customer case log, and the plurality of predictors from the new customer case log.

The system 700 may further include additional instructions that, when executed by the processor 720, cause the processor 720 to select a first sample of historical key variables and corresponding predictors, to oversample the selected first sample into a plurality of simulated samples, to calculate rare events prediction model regression coefficients based on the plurality of simulated samples, and to build the rare events prediction model based on the rare events prediction model regression coefficients.

The system 700 may further include additional instructions that, when executed by the processor 720, cause the processor 720 to unbias the escalation prediction model regression coefficients to compensate for the oversampling.

The above examples may be implemented by hardware or software in combination with hardware. For example the various methods, processes and functional modules described herein may be implemented by a physical processor (the term processor is to be interpreted broadly to include CPU, processing module, ASIC, logic module, or programmable gate array, etc.). The processes, methods and functional modules may all be performed by a single processor or split between several processors; reference in this disclosure or the claims to a "processor" should thus be interpreted to mean "at least one processor". The processes, methods and functional modules are implemented as machine readable instructions executable by at least one processor, hardware logic circuitry of the at least one processors, or a combination thereof.

The drawings in the examples of the present disclosure are some examples. It should be noted that some units and functions of the procedure are not necessarily essential for implementing the present disclosure. The units may be combined into one unit or further divided into multiple sub-units. What has been described and illustrated herein is an example of the disclosure along with some of its variations. The terms, descriptions and figures used herein are set forth by way of illustration. Many variations are possible within the spirit and scope of the disclosure, which is intended to be defined by the following claims and their equivalents.

What is claimed is:

1. A method comprising:
receiving, by a processor, a plurality of historical input logs, wherein each log includes at least one key variable and unstructured data;
applying, by the processor, text mining techniques to the unstructured data to obtain at least one predictor based on the unstructured data;
selecting, from the plurality of historical input logs, a first sample of historical key variables and corresponding predictors;
oversampling the selected first sample into a plurality of simulated samples;
calculating escalation prediction model regression coefficients based on the plurality of simulated samples; and
creating, by the processor, an escalation prediction model based on the escalation prediction model regression coefficients, the at least one key variable, and the at least one predictor.

2. The method of claim 1, the method further comprising:
receiving, by the processor, a new input log;
identifying, by the processor, at least one key variable and unstructured data from the new input log;
applying, by the processor, text mining techniques to the unstructured data from the new input log to obtain at least one predictor from the new input log; and
forecasting an escalation based on the escalation prediction model, the at least one key variable from the new input log, and the at least one predictor obtained from the new input log.

3. The method of claim 1, wherein the unstructured data includes at least one of:
product features, industry of the customer, an explanation of the problem, customer comments, or a combination thereof.

4. The method of claim 1, wherein applying text mining techniques comprises:
parsing the unstructured data into a plurality of parsed words;
removing stop words from the plurality of parsed words, wherein stop words are frequently used words that do not provide predictive value; and stemming the plurality of parsed words into a plurality of predictors.

5. The method of claim 4, further comprising identifying the stop words using string techniques.

6. The method of claim 4, wherein stemming comprises grouping together parsed words that share the same root as a predictor.

7. The method of claim 1, further comprising unbiasing the escalation prediction model regression coefficients to compensate for the oversampling.

8. The method of claim 1, further validating the escalation prediction model based on a second sample of historical key variables and corresponding predictors different to the first sample of historical key variables and corresponding predictors.

9. A system for predicting escalations in a customer service center the system comprising:
a physical processor;
a non-transitory storage medium storing machine readable instructions to cause the processor to:
receive a plurality of historical customer case logs, each log including a plurality of fields;
obtain a plurality of predictors from data included in the plurality of fields;
select a first sample of the customer case logs;
oversample the selected first sample into a plurality of simulated samples;
calculate escalation prediction model regression coefficients for the plurality of predictors based on the plurality of simulated samples; and
build an escalation prediction model based on the escalation prediction model regression coefficients.

10. The system of claim 9, wherein the machine readable instructions further include instructions to cause the processor to:
receive a new customer case log;
obtain a second plurality of predictors from the new customer case log; and
forecast an escalation based on the escalation prediction model and the second plurality of predictors obtained from the new customer case log.

11. The system of claim 9, wherein the plurality of fields include unstructured text data and the machine readable instructions include instructions to text mine the unstructured text data to obtain the plurality of predictors.

12. The system of claim 11, wherein the machine readable instructions further include instructions to cause the processor to:
parse the unstructured text data into a plurality of parsed words;
remove stop words from the plurality of parsed words, wherein stop words are frequently used words that do not provide predictive value; and
stem the plurality of parsed words into a plurality of predictors.

13. The system of claim 12, wherein the machine readable instructions further include instructions to cause the processor to identify the stop words using string techniques.

14. The system of claim 12, wherein the machine readable instructions further comprise instructions to cause the processor to stem by grouping together parsed words that share a same root as a predictor.

15. The system of claim 9, wherein the machine readable instructions further include instructions to cause the processor to unbias the escalation prediction model regression coefficients to compensate for the oversampling.

16. A non-transitory machine-readable medium storing machine-readable instructions executable by a physical processor that cause the processor to:
receive a plurality of historical customer case logs, wherein each log includes at least one key variable and unstructured data;
parse the unstructured data into a plurality of parsed words;
remove stop words from the plurality of parsed words, wherein stop words are frequently used words that do not provide predictive value;
stem the plurality of parsed words into a plurality of predictors;
create an escalation prediction model based on the at least one key variable and the plurality of predictors;
receive a new customer case log;
identify at least one key variable and unstructured data from the new customer case log;
apply text mining techniques to the unstructured data from the new customer case log to obtain a corresponding plurality of predictors from the new customer case log; and
forecast an escalation to result from the new customer case log based on the escalation prediction model, the key variables from the new customer case log, and the plurality of predictors from the new customer case log.

17. The non-transitory machine-readable medium of claim 16 further comprising machine readable instructions that are executable by the processor to:
select a first sample of historical key variables and corresponding predictors;
oversample the selected first sample into a plurality of simulated samples;
calculate escalation prediction model regression coefficients based on the plurality of simulated samples; and
build the escalation prediction model based on the escalation prediction model regression coefficients.

18. The non-transitory machine-readable medium of claim 17 further comprising machine readable instructions that are executable by the processor to unbias the escalation prediction model regression coefficients to compensate for the oversampling.

* * * * *